UNITED STATES PATENT OFFICE.

OSCAR R. LOEWENTHAL, OF VANCOUVER, BRITISH COLUMBIA, CANADA.

INSECTIFUGE.

1,029,203.  Specification of Letters Patent.  Patented June 11, 1912.

No Drawing.  Application filed March 7, 1912.  Serial No. 682,280.

*To all whom it may concern:*

Be it known that I, OSCAR R. LOEWENTHAL, citizen of the United States of America, residing at Vancouver, in the Province of British Columbia, Canada, have invented a new and useful Insectifuge, of which the following is a specification.

This invention relates to a composition powder for driving cockroaches from a locality, which they may infest.

It consists of the composition with an ingredient which possesses characteristics, which are objectionable to the cockroach, with other ingredients designed to preserve unimpaired the peculiarities, which are distasteful to the cockroach, and that will prevent the powder from becoming lumpy.

The composition and the reason for the introduction of the several ingredients are particularly described in the following specification.

The primary ingredient in this composition is powdered borax, which experience has proved to be particularly objectionable to the cockroach, whether on account of the sharp corners of the crystals or otherwise I am unable to say definitely. The use of the borax alone is not satisfactory as it deteriorates in the purpose for which it is designed, when exposed to moisture, presumably as the crystals lose their sharp edges. To prevent the moisture attacking the borax crystals I associate with it dry common salt on the theory that the salt will appropriate the moisture which might otherwise attack the borax. In order to prevent the borax and salt from becoming lumpy, I add flour of sulfur and boracic acid in equal proportions, which being non-absorbent and non-adherent prevent the particles of salt and borax from adhering together and enable the powder to maintain its condition as a dry loose powder in which condition it is desirable that it should be applied to the haunts of the cockroach.

The proportions as used are as follows: two parts by weight of powdered borax, one part of dry common salt, one part of flour of sulfur and one part of boracic acid. The salt is first well dried in a heated vessel which heat is maintained until after the powdered borax has been added and is thoroughly mixed with it and thereafter the sulfur and boracic acid are added and the whole is thoroughly mixed together and packed in air-tight tins or cartons. The powder thus prepared is dusted over the nests and runways of the cockroach with the result that they vacate their haunts and leave the premises.

Having now particularly described my invention and the manner of preparing the same, I hereby declare that what I claim as new and desire to be protected in by Letters Patent, is:

1. The insectifuge, comprising powdered borax, dry common salt and flour of sulfur substantially as specified.

2. The insectifuge, comprising powdered borax, dry common salt, flour of sulfur and boracic acid.

3. The insectifuge, comprising two parts by weight of powdered borax, one part of dry common salt, one part of flour of sulfur and one part of boracic acid.

In testimony whereof I have signed my name to this specification in the presence of two subscribing witnesses.

OSCAR R. LOEWENTHAL.

Witnesses:
  ROWLAND BRATTAIN,
  WM. S. SOUTAR.